(12) United States Patent
Lasseter et al.

(10) Patent No.: US 7,715,950 B2
(45) Date of Patent: May 11, 2010

(54) NON-INVERTER BASED DISTRIBUTED ENERGY RESOURCE FOR USE IN A DYNAMIC DISTRIBUTION SYSTEM

(75) Inventors: Robert H. Lasseter, Madison, WI (US); Shashank Krishnamurthy, Rocky Hill, CT (US)

(73) Assignee: Wisconsin Alumni Research Foundation, Madison, WI (US)

( * ) Notice: Subject to any disclaimer, the term of this patent is extended or adjusted under 35 U.S.C. 154(b) by 305 days.

(21) Appl. No.: 11/681,014

(22) Filed: Mar. 1, 2007

(65) Prior Publication Data
US 2008/0215187 A1    Sep. 4, 2008

(51) Int. Cl.
*G05D 11/00* (2006.01)
*H02P 27/00* (2006.01)
*G06F 19/00* (2006.01)
*B60T 7/12* (2006.01)

(52) U.S. Cl. .................. 700/287; 318/798; 700/286; 700/290; 701/99; 701/103; 701/104

(58) Field of Classification Search ............. 700/287, 700/286, 290; 701/99, 10; 318/798
See application file for complete search history.

(56) References Cited

U.S. PATENT DOCUMENTS

| | | |
|---|---|---|
| 4,096,394 A | 6/1978 | Ullmann et al. |
| 4,315,163 A | 2/1982 | Bienville |
| 5,041,959 A | 8/1991 | Walker |
| 5,198,698 A | 3/1993 | Paul et al. |
| 5,329,222 A | 7/1994 | Gyugyi et al. |
| 5,536,976 A | 7/1996 | Churchill |
| 5,559,704 A | 9/1996 | Vanek et al. |
| 5,563,802 A | 10/1996 | Plahn et al. |
| 5,596,492 A | 1/1997 | Divan et al. |
| 5,614,770 A | 3/1997 | Suelzle |
| 5,710,699 A | 1/1998 | King et al. |
| 5,745,356 A | 4/1998 | Tassitino et al. |
| 5,811,960 A | 9/1998 | Van Sickle et al. |

(Continued)

OTHER PUBLICATIONS

Son et al., "A Newton-Type Current Injection Model of UPFC for Studying Low Frequency Oscillations" IEEE p. 1 abstract.*

(Continued)

*Primary Examiner*—Thomas H Stevens
*Assistant Examiner*—Albert DeCady
(74) *Attorney, Agent, or Firm*—Foley & Lardner LLP

(57) ABSTRACT

A microsource is provided, which includes a generator, a prime mover, and a controller. The prime mover includes a shaft connected to drive the generator to generate power at a frequency controlled by a rotation rate of the shaft. The controller calculates an operating frequency for the generator based on a comparison between a power set point and a measured power flow. A requested shaft speed for the prime mover is calculated by combining a maximum frequency change, a minimum frequency change, and the calculated operating frequency. A shaft speed adjustment is calculated for the prime mover based on a comparison between the requested shaft speed and a measured shaft speed of the prime mover. A fuel command for the prime mover is calculated based on the shaft speed adjustment. A rotation rate of the shaft of the prime mover is adjusted based on the calculated fuel command to control the frequency.

20 Claims, 12 Drawing Sheets

U.S. PATENT DOCUMENTS

| | | | |
|---|---|---|---|
| 6,014,015 A | 1/2000 | Thorne et al. | |
| 6,111,764 A | 8/2000 | Atou et al. | |
| 6,134,124 A | 10/2000 | Jungreis et al. | |
| 6,172,432 B1 | 1/2001 | Schnackenberg et al. | |
| 6,188,205 B1 | 2/2001 | Tanimoto et al. | |
| 6,219,591 B1 | 4/2001 | Vu et al. | |
| 6,219,623 B1 | 4/2001 | Wills | |
| 6,249,411 B1 | 6/2001 | Hemena et al. | |
| 6,252,310 B1 | 6/2001 | Wilhelm | |
| 6,285,917 B1 | 9/2001 | Sekiguchi et al. | |
| 6,288,456 B1 | 9/2001 | Cratty | |
| 6,347,027 B1 | 2/2002 | Nelson et al. | |
| 6,356,471 B1 | 3/2002 | Fang | |
| 6,359,423 B1 | 3/2002 | Noro | |
| 6,465,910 B2 | 10/2002 | Young et al. | |
| 6,693,809 B2 | 2/2004 | Engler | |
| 6,787,933 B2 | 9/2004 | Claude et al. | |
| 6,812,586 B2 | 11/2004 | Wacknow et al. | |
| 6,870,279 B2 | 3/2005 | Gilbreth et al. | |
| 7,042,110 B2 | 5/2006 | Mikhail et al. | |
| 7,069,673 B2 | 7/2006 | Kagoshima et al. | |
| 7,116,010 B2 * | 10/2006 | Lasseter et al. | 307/45 |
| 2003/0036806 A1 | 2/2003 | Schienbein et al. | |
| 2004/0051387 A1 | 3/2004 | Lasseter et al. | |
| 2004/0080165 A1 | 4/2004 | Geis et al. | |
| 2006/0208574 A1 | 9/2006 | Lasseter et al. | |

OTHER PUBLICATIONS

Lasseter, Robert, Kevin Tomsovic, and Paolo Piagi. "Scenarios for Distributed Technology Applications with Steady State and Dynamic Models of Loads and Micro-Sources," Consortium for Electric Reliability Technology Solutions. Apr. 14, 2000, p. 305-308.

DOE News, The DER Weekly, vol. 2, No. 10, pp. 1-4. Mar. 9, 2001.

Lasseter, Robert, et al. "White Paper on Integration of Distributed Energy Resources the CERTS MicroGrid Concept," Consortium for Electric Reliability Technology Solutions, pp. 1-27. Apr. 2002.

Lasseter, Robert, "MicroGrids," IEEE, No. 0-7803-7322-7, pp. 305-308. Jul. 2002.

PCT International Search Report and Written Opinion for PCT/US2008/054566 dated Jul. 11, 2008.

PCT International Search Report and Written Opinion for PCT/US2008/054572 dated Jul. 11, 2008.

PCT International Search Report and Written Opinion for PCT/US2008/054577 dated Jul. 11, 2008.

Office Action issued in USSN 11/681,024 mailed on May 27, 2009.

* cited by examiner

NON-INVERTER BASED DISTRIBUTED ENERGY RESOURCE FOR USE IN A DYNAMIC DISTRIBUTION SYSTEM

REFERENCE TO GOVERNMENT RIGHTS

This invention was made with United States government support awarded by the following agencies: National Science Foundation, Electrical & Communications System Div., Award No. 0078522. The United States government has certain rights in this invention.

FIELD

The field of the disclosure relates generally to power systems. More specifically, the disclosure relates to a controller for a non-inverter based distributed energy resource used as part of a dynamic distribution system.

BACKGROUND

The demand for electrical power continues to grow worldwide. At the same time, aging transmission and distribution systems remain subject to occasional failures. Massive failures covering wide geographical areas and affecting millions of people have occurred, even in the United States, which has historically enjoyed a relatively reliable electrical power system. Problems with the capacity and reliability of the public power grid have driven the development of distributed energy resources (DER), small independent power generation systems which may be owned by, and located near, consumers of electrical power. DERs include a wide range of technologies, such as internal combustion engines, gas turbines, microturbines, photovoltaic cells, fuel cells, wind-power, storage systems, etc.

DERs can provide reliable power in critical applications as a backup to the primary electrical supply. For example, an interruption of power to a hospital can have life-threatening consequences. Similarly, when power to a factory is interrupted, productivity is lost, materials in process are wasted, and other costs are incurred in association with restarting the production line. Additionally, power from a DER can be provided to the main power grid to reduce energy price peaks by arbitraging energy price differentials. Geographically distributed sources of power, such as wind, solar, or hydroelectric power, may be too limited or intermittent to be used as the basis for a centralized power plant. However, these types of power sources can supplement or replace conventional power sources when the main power grid is available and can provide a backup when the main power grid is unavailable to increase energy efficiency and to reduce pollution and greenhouse gas emissions through the use of combined heat and power DER systems. DERs also can be used to meet load growth requirements and to enhance the robustness of the transmission system with a minimal addition of new lines.

DERs may be designed to operate in one of two modes: (1) "isolation" or "island" mode, wherein the DER is isolated from the main grid, and (2) normal "grid" mode, wherein the DER is connected to the main grid to either import power from or export power to the main grid. Smooth and efficient transition between the two modes is necessary to effectively integrate DERs into the distribution system without harming the integrity of the remaining system. A centralized electrical power utility is in a position to monitor and coordinate the production and distribution of power from multiple generators. In contrast, DERs may include independent producers of power who have limited awareness or communication with each other. Even if the independent producers of power are able to communicate with each other, there may not be an effective way to ensure that they cooperate. As a result, to realize the potential of integrating DERs into the distribution system, the integration should not depend on complex, centralized command and control systems.

Generally speaking, DERs can include two broad categories of electrical power sources: Direct current (DC) sources, such as fuel cells, solar cells, and batteries; and high-frequency analog current (AC) sources, such as micro-turbines and wind turbines. Both types of sources are typically used to provide an intermediate DC voltage, that may be produced directly by DC sources, and produced indirectly from AC sources, for example by rectification. In both types of sources, the intermediate DC voltage is subsequently converted to AC voltage or current at the required frequency, amplitude, and phase angle for use. In most cases, the conversion from the intermediate DC voltage to the usable AC voltage is performed by a voltage inverter that can rapidly control the magnitude and phase of its output voltage.

A DER generator may be a permanent magnet or a wound field machine. The prime mover for the generator may be an engine, a turbine (gas, wind, steam, micro, etc.), a mechanical storage such as a flywheel, etc. In the case of a permanent magnet generator, the front end may consist of a rectifier feeding a DC bus which requires an inverter to interface with the AC system. The control of the inverter-based source is described, for example, in U.S. Pat. No. 7,116,010 and/or in U.S. Patent Publication No. 2006/000208574, the contents of which are incorporated by reference. Where the disclosure of the present application is limited by or in conflict with the disclosures of U.S. Pat. No. 7,116,010 and U.S. Patent Publication No. 2006/000208574, the disclosure of the present application controls. In contrast, wound field generators generally use an exciter to control the AC voltage and relative phase produced by the machine. No inverter is needed because the machine provides the AC voltage at the desired frequency as long as the speed of the shaft is kept approximately equal to a fixed value. The reduced cost of this type of system due to the absence of the power electronic front end is a significant advantage over other types of systems. However, one of the primary drawbacks of this type of system is that, without the inverter front end, the dynamics of the prime mover cannot be decoupled from the output of the generator. What is needed, therefore, is a method and a system capable of effective utilization of a non-inverter based DER system.

SUMMARY

A method and a system for effective utilization of a non-inverter based DER system are provided in an exemplary embodiment. The system responds to events using only local information available to the DER system to provide voltage regulation and power vs. frequency droop as required for use in a microgrid and as part of a public power grid. A shaft rotation speed of the prime mover is controlled using a fuel command determined based on a requested operating frequency for the system.

In an exemplary embodiment, a controller for controlling a non-inverter based distributed energy resource is provided. The controller calculates a maximum frequency change for a generator based on a comparison between a first power set point and a measured power from the generator. The controller further calculates a minimum frequency change for the generator based on a comparison between a second power set point and the measured power from the generator. The controller still further calculates an operating frequency for the generator based on a comparison between a power set point and a measured power flow. A requested shaft speed for a prime mover is calculated by combining the calculated maximum frequency change, the calculated minimum frequency change, and the calculated operating frequency. A shaft speed adjustment for the prime mover is calculated based on a comparison between the calculated requested shaft speed and a measured shaft speed of the prime mover. A fuel command for the prime mover is calculated based on the calculated shaft speed adjustment to adjust a rotation rate of a shaft of the prime mover thereby controlling a frequency of an output power of the generator.

In an exemplary embodiment, a microsource is provided. The microsource includes a generator, a prime mover, and a controller. The prime mover includes a shaft connected to drive the generator to generate power at a frequency controlled by a rotation rate of the shaft. The controller calculates a maximum frequency change for the generator based on a comparison between a first power set point and a measured power from the generator. The controller further calculates a minimum frequency change for the generator based on a comparison between a second power set point and the measured power from the generator. The controller still further calculates an operating frequency for the generator based on a comparison between a power set point and a measured power flow. A requested shaft speed for the prime mover is calculated by combining the calculated maximum frequency change, the calculated minimum frequency change, and the calculated operating frequency. A shaft speed adjustment for the prime mover is calculated based on a comparison between the calculated requested shaft speed and a measured shaft speed of the prime mover. A fuel command for the prime mover is calculated based on the calculated shaft speed adjustment to adjust the rotation rate of the shaft of the prime mover thereby controlling the frequency.

In another exemplary embodiment, a method of controlling a non-inverter based distributed energy resource is provided. A maximum frequency change for a generator is calculated based on a comparison between a first power set point and a measured power from the generator. A minimum frequency change for the generator is calculated based on a comparison between a second power set point and the measured power from the generator. An operating frequency for the generator is calculated based on a comparison between a power set point and a measured power flow. A requested shaft speed for a prime mover is calculated by combining the calculated maximum frequency change, the calculated minimum frequency change, and the calculated operating frequency. A shaft speed adjustment for the prime mover is calculated based on a comparison between the calculated requested shaft speed and a measured shaft speed of the prime mover. A fuel command for the prime mover is calculated based on the calculated shaft speed adjustment. A rotation rate of a shaft of the prime mover is adjusted based on the calculated fuel command to control a frequency of an output power of the generator.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
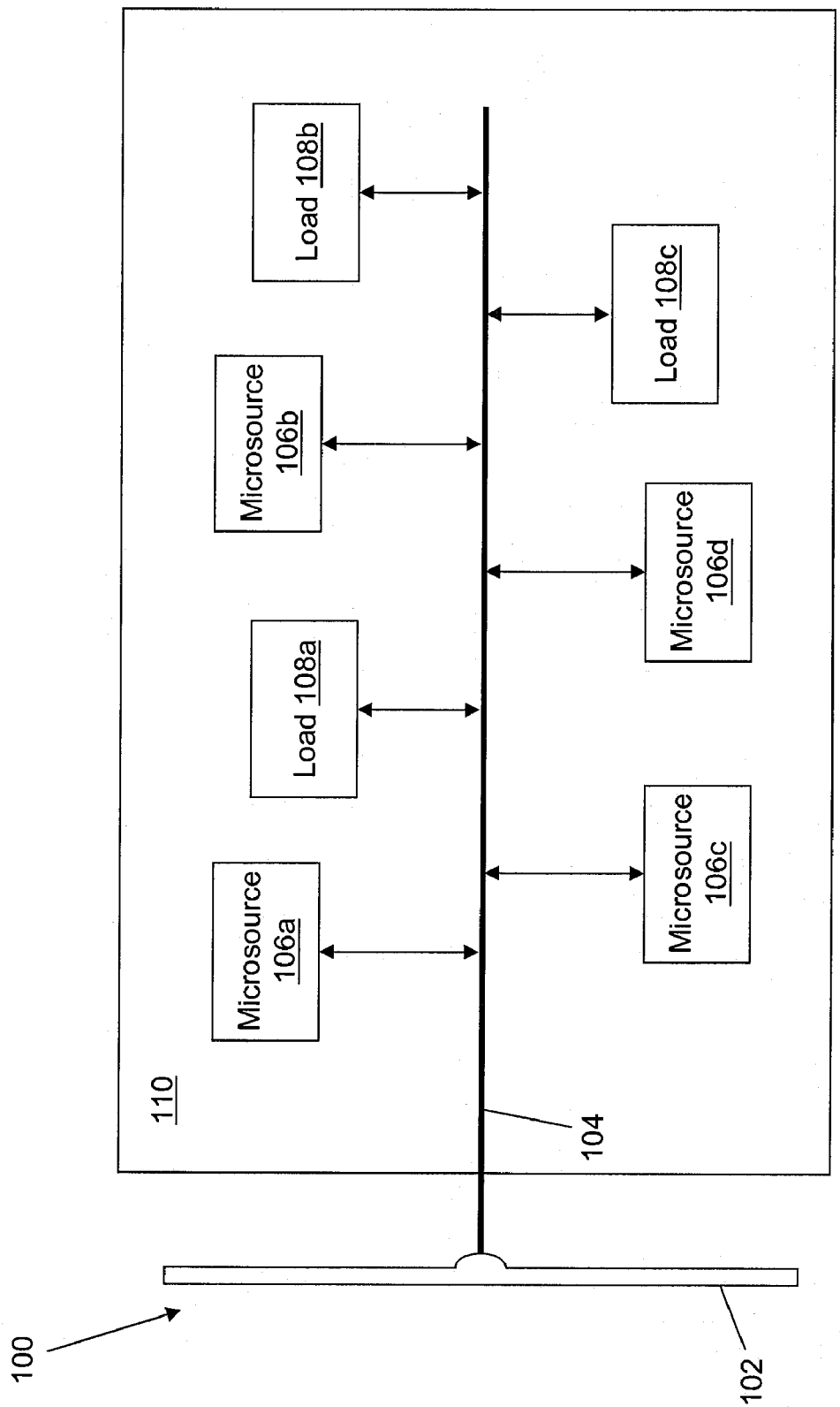
FIG. 1 depicts a block diagram of a distributed energy resource system in accordance with an exemplary embodiment.

With reference to FIG. 1, a distributed energy resource (DER) system 100 is shown in accordance with an exemplary embodiment. Such an exemplary system is described, for example, in U.S. Pat. No. 7,116,010 and/or in U.S. Patent Publication No. 2006/000208574. DER system 100 may include a utility supply 102 connected to a feeder line 104 that interconnects one or more microsource systems 106a, 106b, 106c, and 106d and one or more loads 108a, 108b, and 108c. DER system 100 may include a plurality of feeder lines. Feeder line 104, the one or more microsource systems 106a, 106b, 106c, and 106d, and the one or more loads 108a, 108b, and 108c can form a microgrid 110. Utility supply 102 can connect microgrid 110 to other similar microgrids distributed throughout DER system 100. A microsource system can include exemplary microsource power sources, power storage, and power controllers. The power source can be, for example, a fuel cell, hydroelectric generator, photovoltaic array, windmill, microturbine, etc. The power storage, if present, can be, for example, a battery or flywheel.

Feeder line 104 may include one or more interface switches. An exemplary interface switch is described, for example, in U.S. patent application Ser. No. 11/266,976, filed Nov. 4, 2005 and entitled INTERFACE SWITCH FOR DISTRIBUTED ENERGY RESOURCES, the contents of which are incorporated by reference. Where the disclosure of the present application is limited by or in conflict with the disclosure of U.S. patent application Ser. No. 11/266,976, the disclosure of the present application controls. The interface switch, if used, can be positioned between feeder line 104 and utility supply 102 so that microgrid 110 can be isolated from utility supply 102. When microgrid 110 is isolated from utility supply 102, the microgrid 110 is said to be operating in "island mode". When microgrid 110 is connected to the utility supply 110, the microgrid 110 is said to be operating in "grid mode". When DER system 100 is connected to the grid, the one or more loads 108a, 108b, and 108c may receive power from both the grid and local sources, depending on the current situational demands.

When a microsource or microgrid operates in island mode, load tracking problems can arise because typical power sources used in microsources, such as microturbines or fuel cells, tend to respond slowly, with time constants ranging from 10 to 200 seconds. Additionally, these types of power sources may be inertialess. Conventional utility power systems store energy in the inertia of the spinning mass of a generator. When a new load comes online, the initial energy balance can be met by the system's inertia, which results in a slight reduction in system frequency. Because power sources in microsources may be inertialess, a microsource may include power storage to ensure initial energy balance when loads are added during island mode.

Each microsource system 106a, 106b, 106c, and 106d preferably includes a microsource controller. The microsource controller responds to events using local information to respond to voltage drops, faults, blackouts, etc. and to switch to island operation mode as needed. The microsource controller controls the change in the output power of the system components as they change from a dispatched power mode to one in which frequency is controlled and load following is provided. Control schemes for a power controller in DER system 100 can be classified into one of three broad classes: unit power control, zone power control, and a mixed system using both unit power control and zone power control. Using a unit power controller, load changes are matched by a corresponding power injection from the utility because a microsource holds its injection to a set point $P_0$. During island mode, the microsource matches the power demand as loads change. Each microsource system 106a, 106b, 106c, and 106d regulates the voltage magnitude at its connection point and the injected power using either a variable slope method or a fixed slope method.

Using a zone power controller, power flow in zones is controlled instead of controlling the power flow from each microsource. Each microsource system 106a, 106b, 106c, and 106d regulates the voltage magnitude at its connection point and the power that is flowing in the feeder. Using a zone power controller, the microsource systems 106a, 106b, 106c, and 106d pick-up extra load demands, and as a result, show a constant load to the utility grid. In this case, DER system 100 becomes a true dispatchable load as seen from the utility side supporting demand-side management arrangements. To reduce confusion, the symbol, F, is used for power flow in a zone and the symbol, P, is used for the power output from a microsource. When connected to the grid, load changes are matched by a different power injection from the microsource because the controller holds the flow of power coming from the grid, $F_{line}$, to a constant value. During island mode, all of the microsources participate in matching the power demand as loads change.

Figure 2:
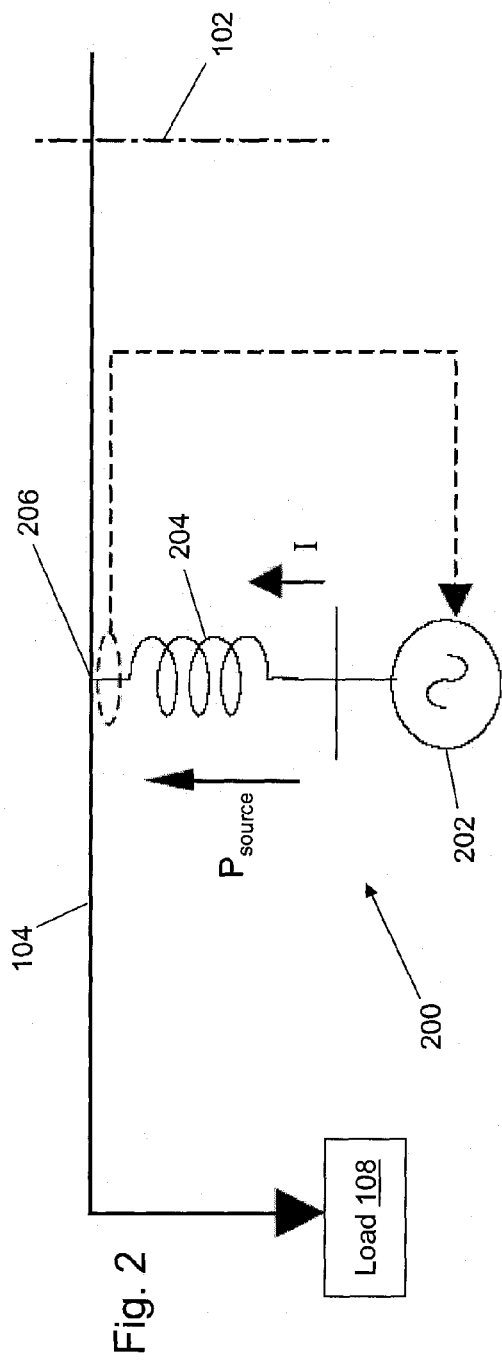
FIG. 2 is a diagram of a microgrid that includes a microsource implementing a unit power control scheme in accordance with an exemplary embodiment.

With reference to FIG. 2, a diagram of a microgrid 200 is shown in accordance with an exemplary embodiment using a unit power controller. Microgrid 200 may include a microsource 202 and a load 108. Microsource 202 may be connected to feeder line 104 by an inductor 204. An interface switch may be provided, for example, in feeder line 104. The interface switch can be opened to isolate microgrid 200 from the rest of DER system 100 and can be closed to connect microgrid 200 to the rest of DER system 100. Microsource 202 may include a controller capable of measuring a current through inductor 204 and of measuring a system voltage at a point 206 in feeder line 104 where inductor 204 joins feeder line 104.

Figure 3:
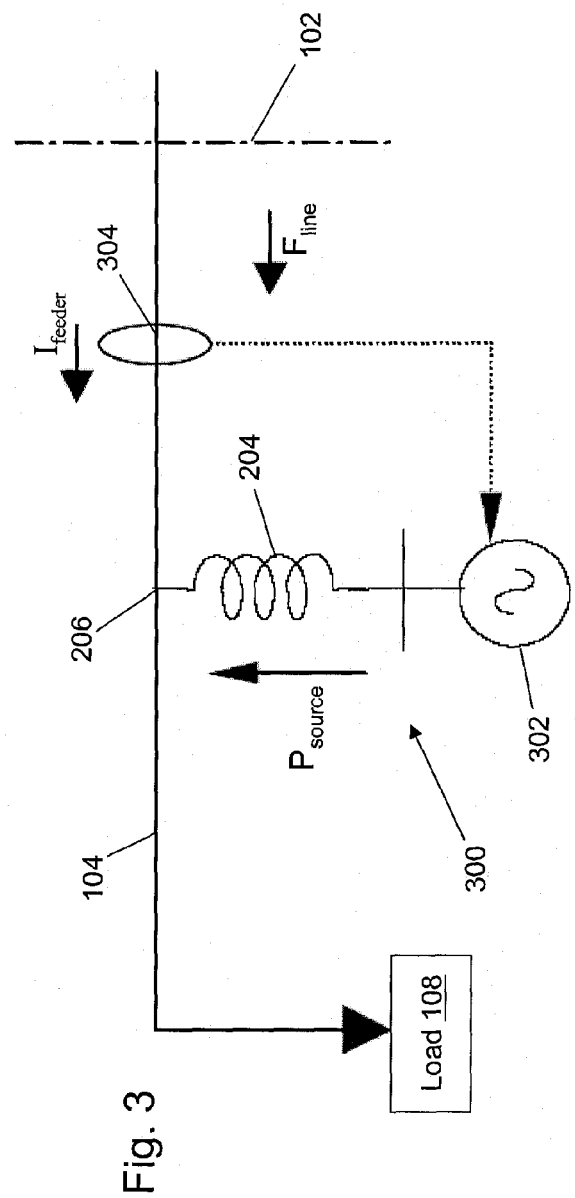
FIG. 3 is a diagram of a microgrid that includes a microsource implementing a zone power control scheme in accordance with an exemplary embodiment.

With reference to FIG. 3, a diagram of a microgrid 300 is shown in accordance with an exemplary embodiment using a zone power controller. Microgrid 300 may include a microsource 302 and load 108. Microsource 302 may be connected to feeder line 104 by inductor 204. An interface switch may be provided, for example, in feeder line 104. The interface switch can be opened to isolate microgrid 300 from the rest of DER system 100 and can be closed to connect microgrid 300 to the rest of DER system 100. Microsource 302 may include a controller capable of measuring a current at a point 304 in feeder line 104 between utility supply 102 and inductor 204 and of measuring a system voltage at a point 206 in feeder line 104 where inductor 204 joins feeder line 104.

Figure 4:
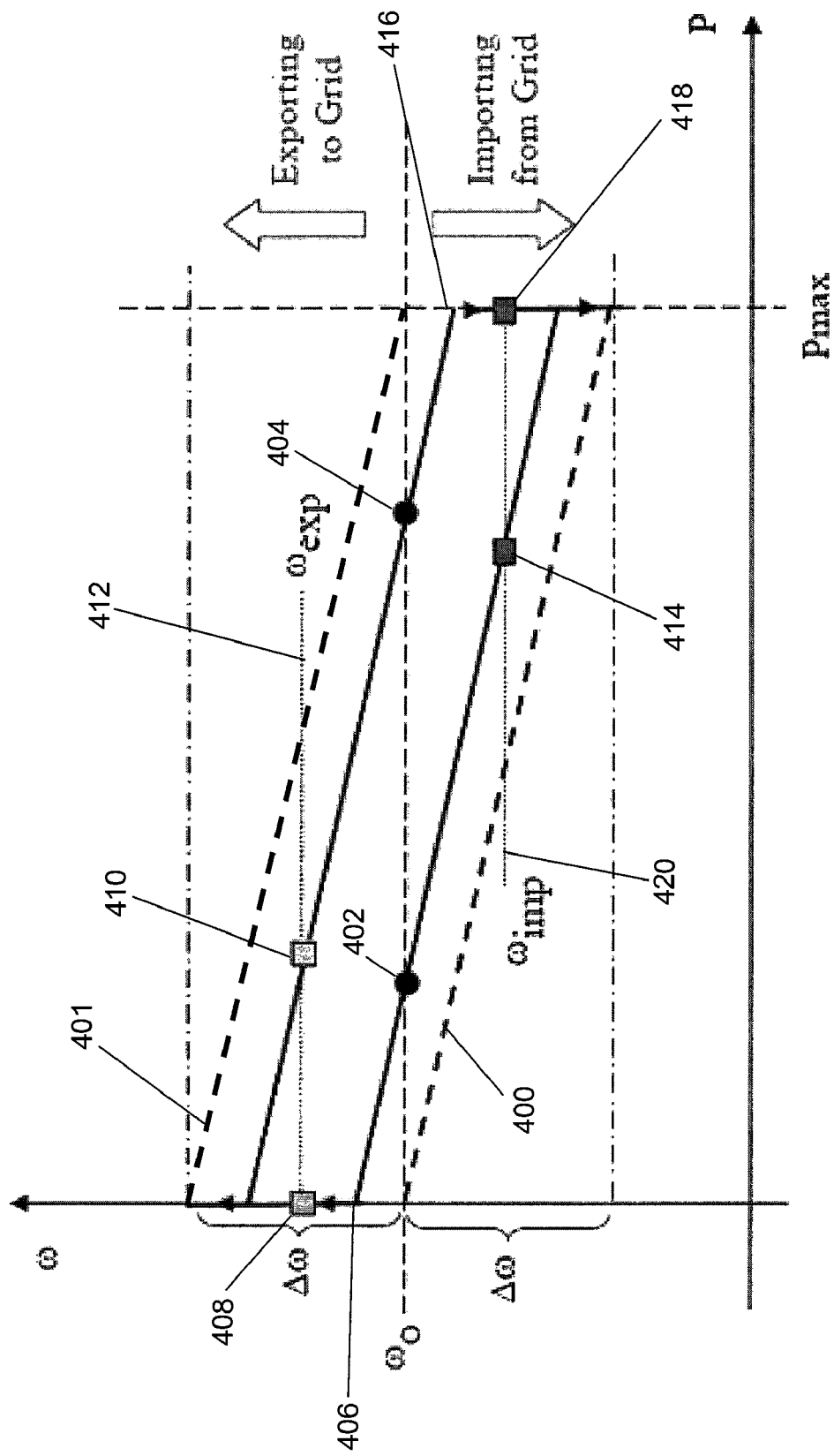
FIG. 4 is a graph depicting the relationship between steady state unit power vs. frequency (P-ω) for two exemplary microsources having different loads for use in a unit power control scheme in accordance with an exemplary embodiment.

With reference to FIG. 4, a graph depicting the relationship between steady state unit power and frequency (P-ω) using a fixed minimum slope method and unit power control is shown in accordance with an exemplary embodiment. FIG. 4 shows steady state characteristics. The response may deviate from the characteristic during a transition period. Two exemplary microsources included in the microgrid are shown. The microsources have different power set points though this is not required. A first microsource has a first power set point 402. A second microsource has a second power set point 404. First power set point 402 and second power set point 404 are the amount of power injected by each source when connected to the grid at a system frequency $\omega_o$. A constant slope $$m = -\frac{\Delta\omega}{P_{max}}$$

allows power to change between P=0 and $P=P_{max}$ as frequency changes over $\Delta\omega$. A lower bounding line 400 extends from P=0 to $P=P_{max}$ with a starting frequency of $\omega_o$. An upper bounding line 401 extends from P=0 to $P=P_{max}$ with a starting frequency of $\omega_o+\Delta\omega$. Because a constant slope is used by the controller, the response lines are all parallel to and extend between lower bounding line 400 and upper bounding line 401.

Movement along the lines of constant slope m in response to a transition to island mode depends on whether or not the microgrid is importing power from or exporting power to the grid. If the system was exporting to the grid before islanding, the resulting frequency of $\omega_{exp}$ 412 is greater than the system frequency $\omega_o$. For example, if the system was exporting to the grid before islanding, the second microsource may move from the system frequency $\omega_o$ at second power set point 404 to a third power set point 410 operating at $\omega_{exp}$ 412. The first microsource may shift from the system frequency $\omega_o$ at first power set point 402 to a fourth power set point 406 at P=0. When the P=0 limit is reached, the slope of the characteristic is switched to vertical, as shown by the arrows, to move the first microsource frequency upwards to a fifth power set point 408 operating at $\omega_{exp}$ 412. The specific set points, of course, depend on the local demands and operating points of the microsources. A P=0 limit may not be reached by either microsource.

If the system was importing from the grid before islanding, the resulting frequency of $\omega_{imp}$ 420 will be smaller than the system frequency $\omega_o$. For example, if the system was importing to the grid before islanding, the first microsource may move from the system frequency $\omega_o$ at first power set point 402 to a sixth power set point 414 operating at $\omega_{imp}$ 420. The second microsource may move from the system frequency $\omega_o$ at second power set point 404 to a seventh power set point 416 at P=$P_{max}$. When the P=$P_{max}$ limit is reached, the slope of the characteristic is switched to vertical, as shown by the arrows, to move the second microsource frequency downwards to an eighth power set point 418 operating at $\omega_{imp}$ 420. The minimum and maximum power limits are enforced by switching the characteristic with constant slope to a vertical steady state characteristic when the minimum or maximum power limit is reached. The specific set points, of course, depend on the local demands and operating points of the microsources. A P=$P_{max}$ limit may not be reached by either microsource.

Figure 5:
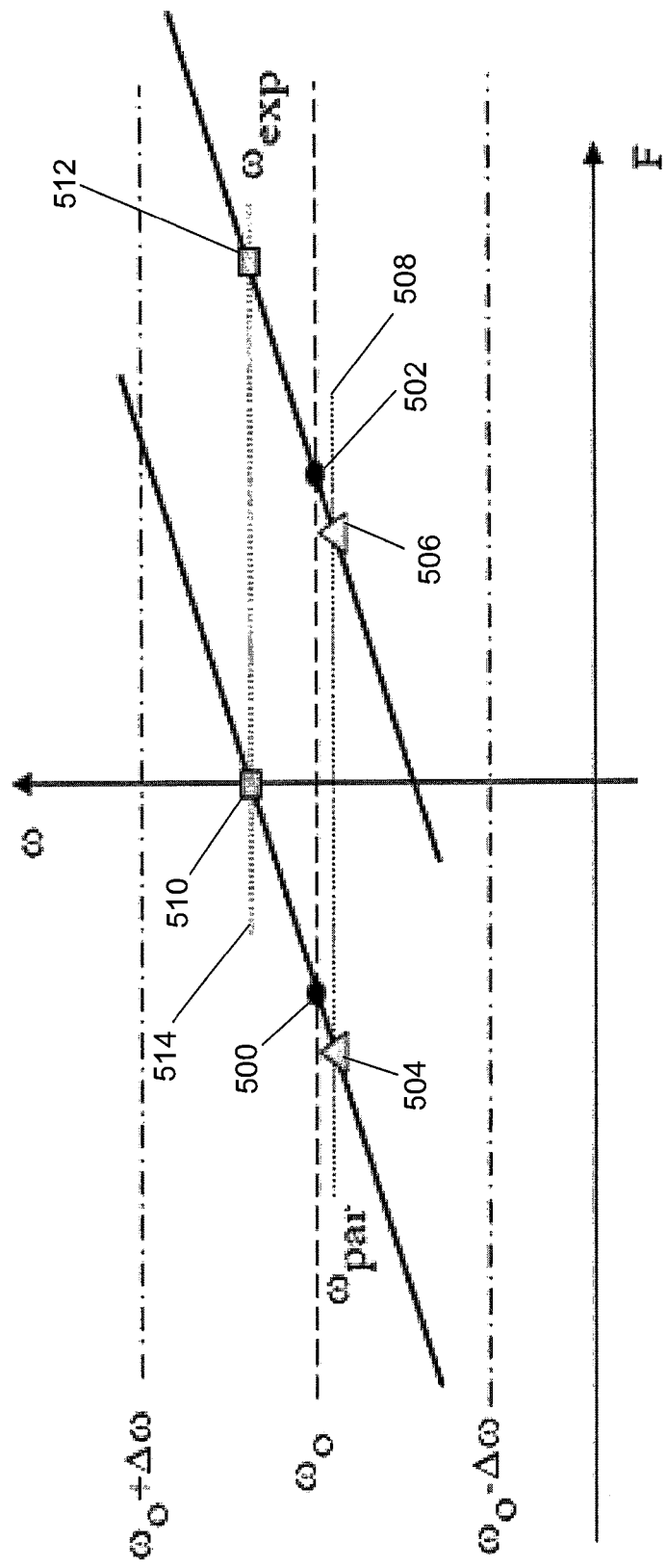
FIG. 5 is a graph depicting the relationship between steady state zone power vs. frequency (F-ω) for two exemplary microsources having different loads for use in a zone power control scheme in accordance with an exemplary embodiment.

With reference to FIG. 5, a graph depicting the relationship between steady state zone power and frequency (F-ω) using a fixed minimum slope method and zone power control is shown in accordance with an exemplary embodiment. Two exemplary microsources are included in the microgrid. The microsources have different power set points. A first microsource has a first flow set point 500. A second microsource has a second flow set point 502. The slope is fixed at the minimum slope m, but has a reversed sign because of the relation between the microsource output power, P, and the zone power flow, F, which can be derived by inspection of FIG. 3 as $F_{line}+P_{source}$=Load. $F_{line}$ is the power (imported means positive) from the rest of DER system 100, and $P_{source}$ is the power injected or absorbed by microsource 302. The power injected or absorbed by microsource 302 is assumed to be greater than the minimum power output, $P_{min}$, of microsource 302 and less than the maximum power output, $P_{max}$, of microsource 302. For a microsource capable of power injection only, $P_{min}$ is positive or zero, while a bidirectional device capable of both power injection or power storage may have $P_{min}$<0. Load is the overall loading level seen by microsource 302.

Figure 6:
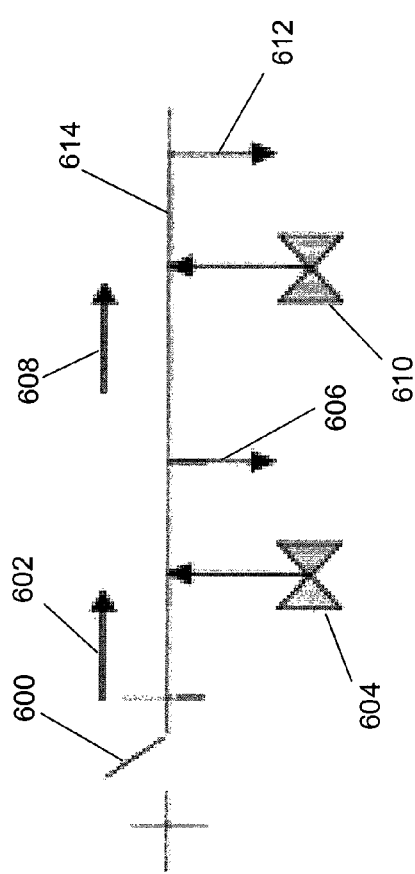
FIG. 6 is a diagram of two microsources used in a single zone in accordance with an exemplary embodiment.

During connection with the grid, the flow in the zones tracks the requested values at the system frequency $\omega_o$. When the microgrid transfers to island mode, the two microsources readjust the flow depending on the arrangement of the microsources with respect to each other and utility supply 102. When regulating unit power, the relative location of loads and microsources is irrelevant, but when regulating zone power flow, the relative location of loads and microsources is important. For example, with reference to FIG. 6, a first microsource 604 and a second microsource 610 are arranged in series in a single zone. The use of a single zone is for illustrative purposes only. There can be a greater or a lesser number of microsources in a single zone.

The zone includes a first load 606 and a second load 612 on a local power bus 614 connected by an interface switch 600 to utility supply 102. During a transition to island mode, interface switch 600 opens. As a result, in a zone power control method for the circuit of FIG. 6, a first flow 602 nearest to the utility system is zero in island mode. A second flow 608 may increase to compensate for the first flow 602 transition to zero. Thus, with reference to FIG. 5, first flow 602 moves from the system frequency $\omega_o$ at first flow set point 500 to a third flow set point 510 operating at the frequency $\omega_{exp}$ 514. Second flow 608 moves from the system frequency $\omega_o$ at second flow set point 502 to a fourth power set point 512. As a result, in island mode, the system operates at frequency $\omega_{exp}$ 514 where first flow 602 is zero. Frequency $\omega_{exp}$ 514 is larger than the nominal system frequency $\omega_o$ because the system was exporting to the grid (|first flow 602|<|second flow 608|), which is the same behavior seen using unit power control.

Figure 7:
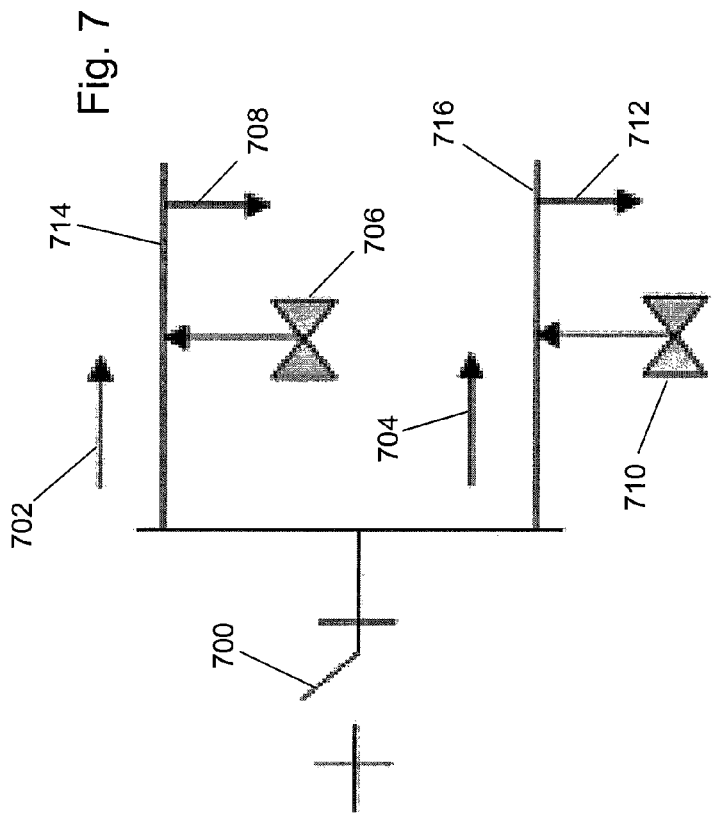
FIG. 7 is a diagram of two microsources used in multiple zones in accordance with an exemplary embodiment.

With reference to FIG. 7, a first microsource 706 and a second microsource 710 are arranged in parallel in two zones. The use of two zones each with a single microsource is for illustrative purposes only. There can be a greater or a lesser number of microsources in a greater or a lesser number of zones. A first load 708 is located on a first local power bus 714 connected by an interface switch 700 to utility supply 102. A second load 712 is located on a second local power bus 716 connected by interface switch 700 to utility supply 102. A first flow 702 flows through first local power bus 714, and a second flow 704 flows through second local power bus 716. The grid flow is the algebraic sum of first flow 702 and second flow 704. During a transition to island mode, interface switch 700 opens.

In a zone power control method for the arrangement of FIG. 7, during island mode, the frequency takes the value where the sum of the flows is zero. As a result as shown on FIG. 5, the frequency in island mode is frequency $\omega_{par}$ 508 where F1=−F2. With reference to FIG. 5, first flow 702 moves from the system frequency $\omega_o$ at first flow set point 500 to a fifth flow set point 504 operating at the frequency $\omega_{par}$ 508. Second flow 704 moves from the system frequency $\omega_o$ at second flow set point 502 to a sixth power set point 506 at the frequency $\omega_{par}$ 508.

Figure 8:
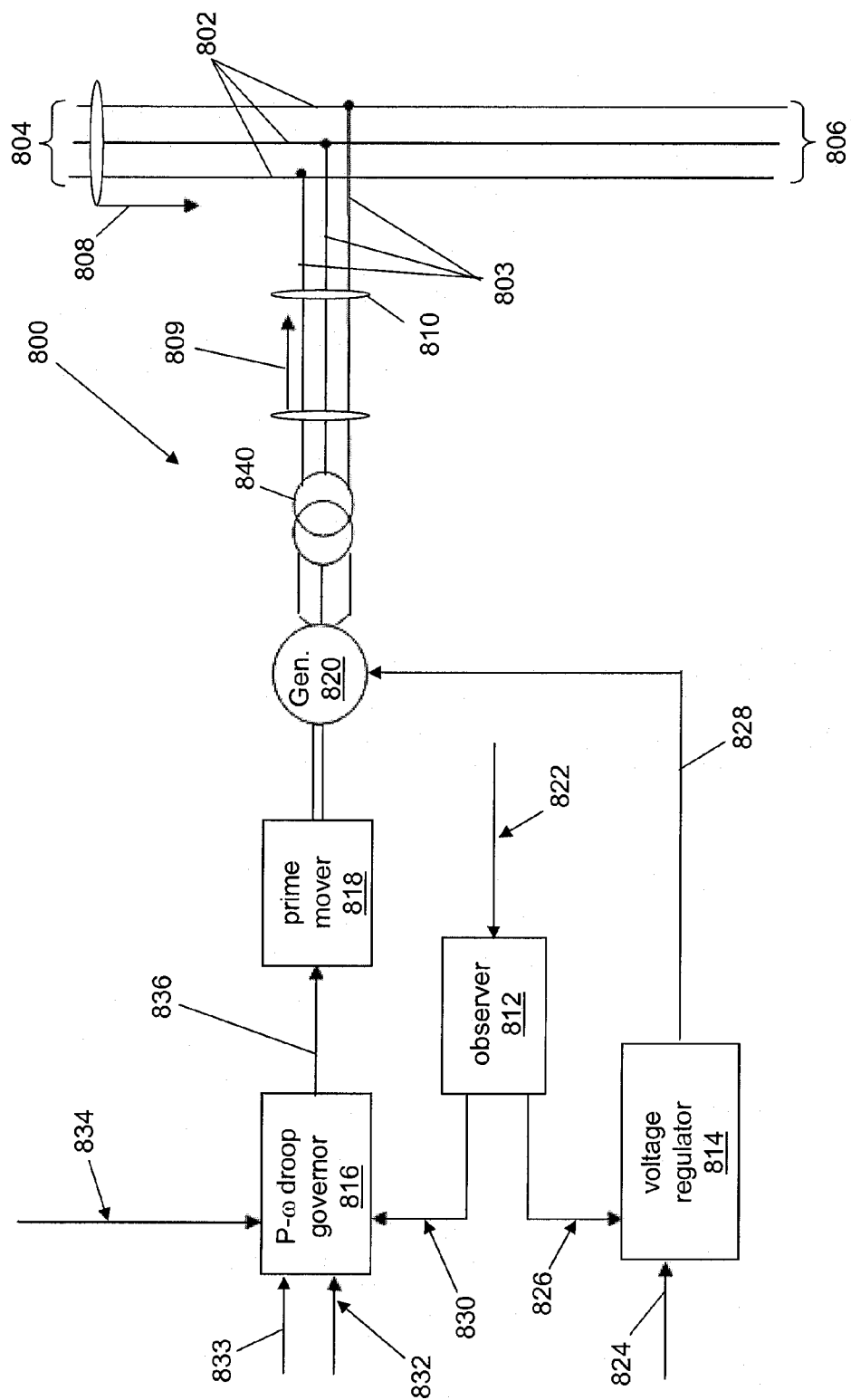
FIG. 8 is a block diagram of a controller for a non-inverter based distributed energy resource in accordance with an exemplary embodiment.

With reference to FIG. 8, a non-inverter based microsource system 800 is shown in accordance with an exemplary embodiment. Microsource system 800 and its various components may be implemented in or include hardware, firmware, software, or any combination of these methods. Thus, microsource system 800 may include circuitry that can implement the processes indicated in the form of hardware, firmware, and/or a processor executing instructions embodied in software. Microsource system 800 connects to a grid through feeder lines 802. Feeder lines 802 extend toward utility supply 102 in a first direction 804 and away from utility supply 102 in a second direction 806. Microsource system 800 connects to feeder lines 802 through bus lines 803. Microsource system 800 may include an observer 812, a voltage regulator 814, a P-ω droop governor 816, a prime mover 818, a field controlled generator 820, and a transformer 840. A first sensor may measure a three phase feeder current 808 through feeder lines 802. A second sensor may measure a three phase feeder bus voltage 810 at the connection point of bus lines 803 with feeder lines 802. A third sensor may measure a three phase bus current 809 through bus lines 803 between transformer 840 and feeder lines 802.

Field controlled generator 820 connects to feeder lines 802 through transformer 840. Field controlled generator 820 may be directly connected to the grid. As a result, transformer 840 need not be included in microsource system 800. For example, if the internal reactance is large enough to achieve the necessary isolation, transformer 840 is not needed. It is well known to drive a generator with a prime mover attached to the rotor shaft of the generator. Typically, the electrical output provided by the generator is responsive to the excitation of a field coil in the generator. Fuel is combusted in prime mover 818 to cause an output shaft to turn at a rotational speed or frequency $\omega_{shaft}$, which in turn drives the frequency of the generator output.

Observer 812 captures local measurements 822 for input to voltage regulator 814 and P-ω droop governor 816. Local measurements 822 may include feeder current 808, feeder bus voltage 810, bus current 809, the angular velocity or frequency of the shaft $\omega_{shaft}$ of field controlled generator 820, a rotor position, etc. Observer 812 uses electrical measurements of current and voltage and measurements of $\omega_{shaft}$ to calculate data needed by voltage regulator 814 and a P-ω droop governor 816. Voltage regulator 814 may utilize a plurality of inputs 826. P-ω droop governor 816 may utilize a plurality of inputs 830. An exemplary observer is discussed further with reference to FIG. 13.

Voltage regulator 814 assists in decoupling interactions between DER microsources and includes a voltage vs. reactive power droop controller so that, as the reactive power Q generated by field controlled generator 820 becomes more capacitive, a local voltage set point 824 is reduced. Conversely, as Q becomes more inductive, the local voltage set point 824 is increased. P-ω droop governor 816 provides the P-ω and/or F-ω functions described with reference to FIGS. 4 and 5. P-ω droop governor 816 additionally provides control over prime mover 818. Prime mover 818 can be, for example, an engine, micro turbine, wind turbine, mechanical storage, etc.

Figure 9:
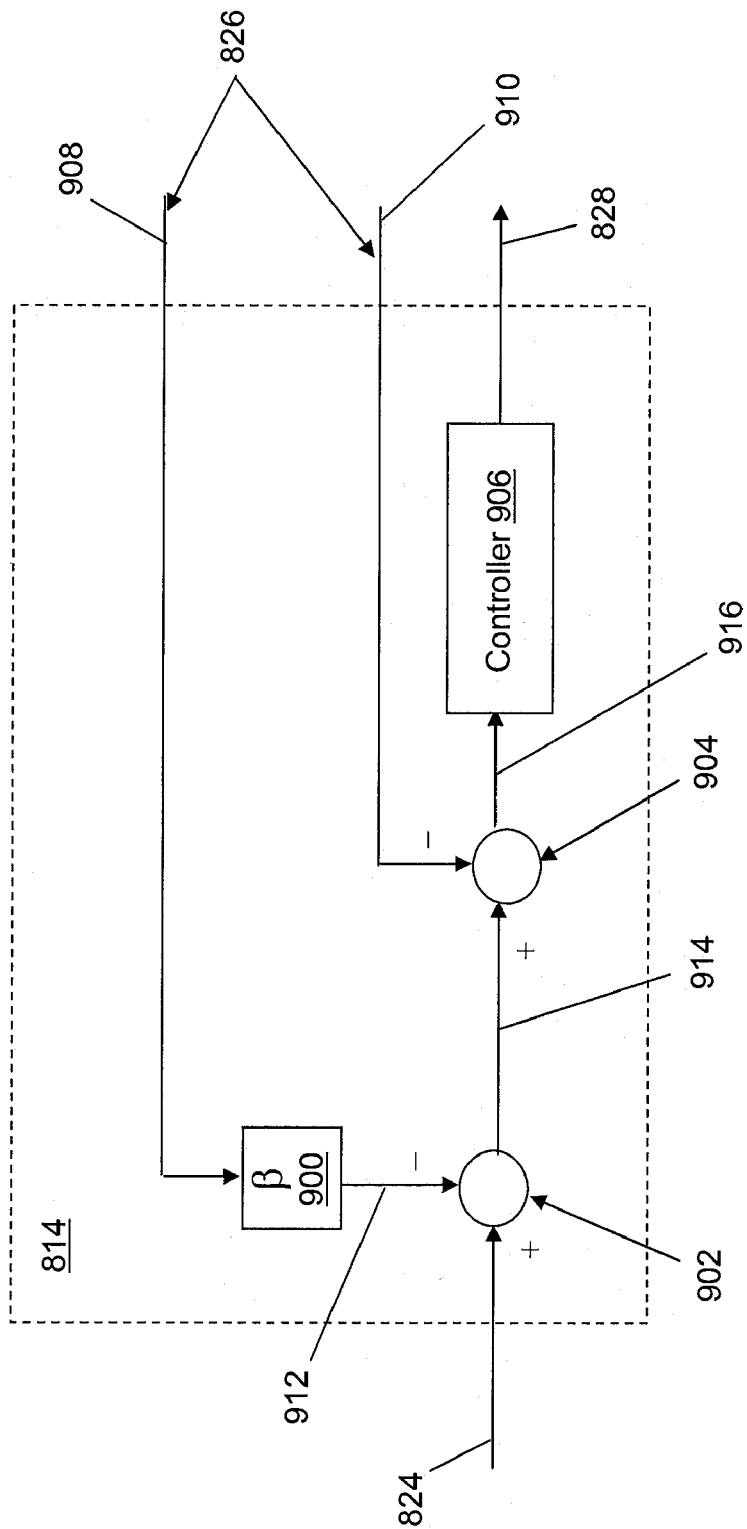
FIG. 9 is a block diagram of a voltage regulator of the controller of FIG. 8 in accordance with an exemplary embodiment.

With reference to FIG. 9, a block diagram of voltage regulator 814 is shown in accordance with an exemplary embodiment. Voltage regulator 814 may include a β block 900, a first summer 902, a second summer 904, and a controller 906. The local voltage set point 824 is input to voltage regulator 814. A regulated output voltage 828 is output from voltage regulator 814 and input to field controlled generator 820. Creating an appropriate regulated output voltage at the terminals of field controlled generator 820 regulates feeder bus voltage 810. A reactive power Q 908 may be calculated by observer 812, for example, using the measured feeder bus voltage 810 and the measured bus current 809 as inputs. Reactive power Q 908 is input to β block 900, which calculates a modified reactive power 912. A terminal voltage 910 may be calculated by observer 812 and input to voltage regulator 814.

Figure 12:
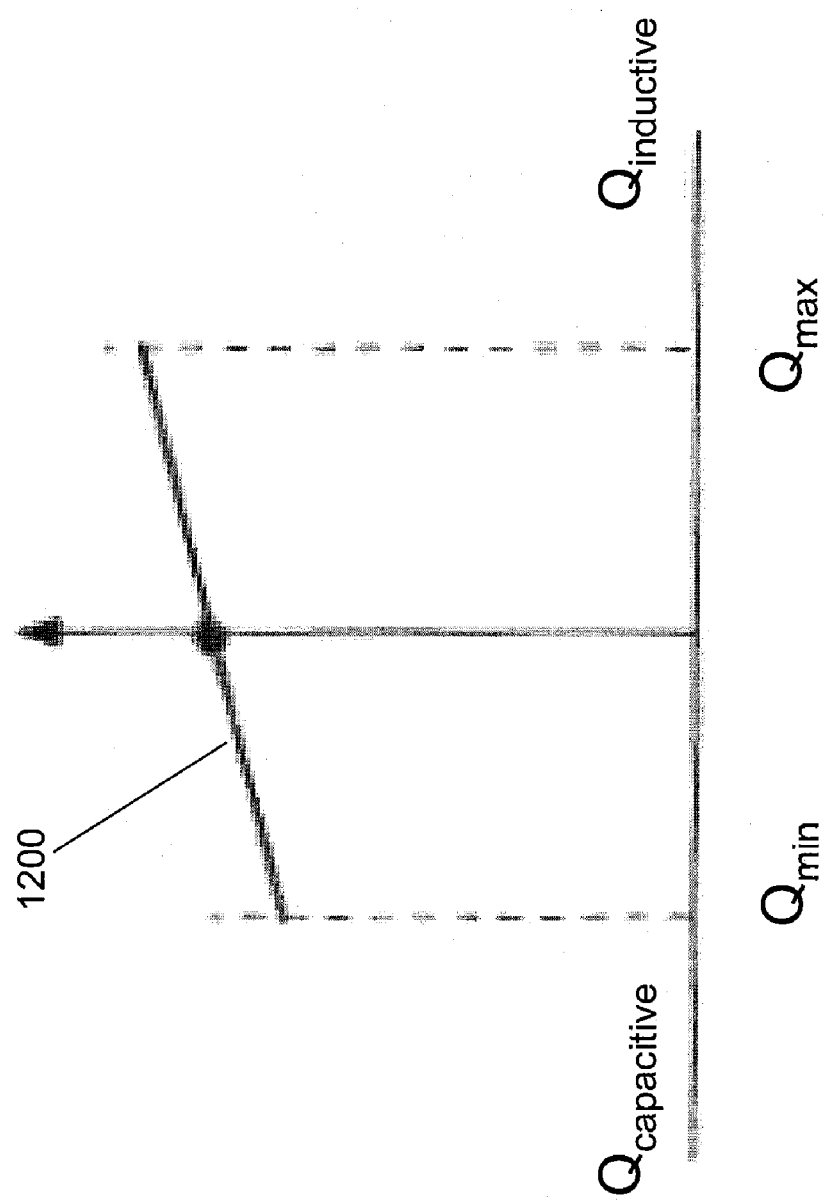
FIG. 12 is a graph of an voltage droop regulation characteristic for a voltage regulator in accordance with an exemplary embodiment.

The modified reactive power 912 is subtracted from local voltage set point 824 in first summer 902 to define a desired local voltage set point 914 based on a droop constant β defined in β block 900. In an exemplary embodiment, β block 900 is implemented to exhibit a voltage vs. reactive current droop as shown with reference to FIG. 12. Droop constant β is the slope of the droop characteristic line 1200. As reactive power Q becomes more inductive, the desired local voltage set point 914 becomes larger than the local voltage set point 824. As reactive power Q becomes more capacitive, the desired local voltage set point 914 becomes smaller than the local voltage set point 824. Terminal voltage 910 is compared to the desired local voltage set point 914 in second summer 904. For example, terminal voltage 910 is subtracted from the desired local voltage set point 914. The resulting voltage error 916 is input to controller 906 to generate the regulated output voltage 828. In an exemplary embodiment, controller 906 is a proportional-integral controller.

Figure 10:
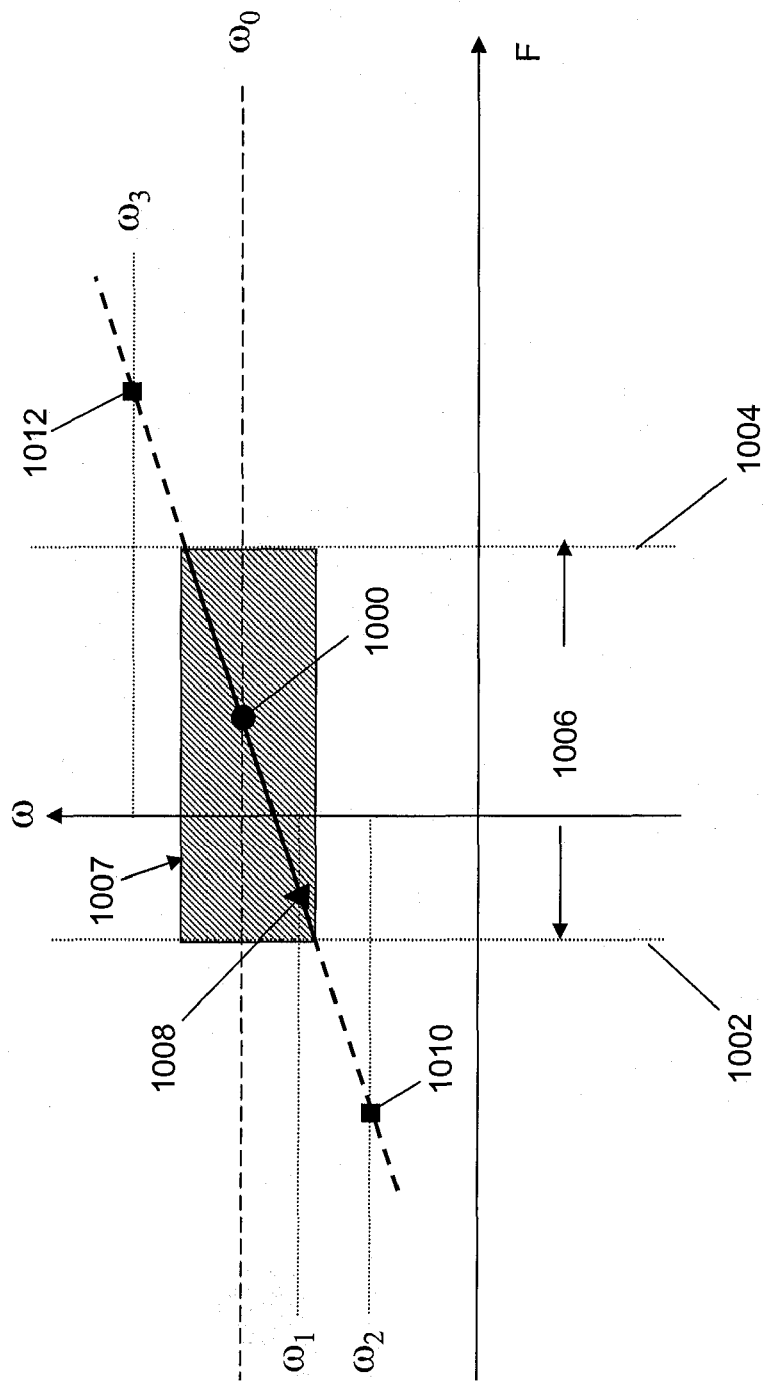
FIG. 10 is a graph depicting a sliding window for applying generating power limits in accordance with an exemplary embodiment.

Field controlled generator 820 can operate in flow control mode with an F-ω characteristic as shown in FIG. 5 or in unit power control mode with a P-ω characteristic as shown in FIG. 4. In either case, the limits of power from field controlled generator 820 are used. With reference to FIG. 10, the range of output power, P, available from field controlled generator 820 imposes a window 1007 on feeder flow, F, such that $P_{load} - P_{max} < F < P_{load} - P_{min}$, where $P_{load}$ is the load on the system, and $P_{max}$ and $P_{min}$ are the power limits of field controlled generator 820. A system F-$\omega_o$ operating point 1000 is defined for the system frequency $\omega_o$. The limits for the feeder flow, F, can be visualized on the F-ω plane as a window whose width 1006 is the difference between $F_{min}$ 1002 and $F_{max}$ 1004 which equals the difference between $P_{max}$ and $P_{min}$. The location of the window on the F-axis depends on the value of $P_{load}$. As $P_{load}$ increases, window 1007 slides to the right on the F-ω plane. Conversely, if the load is reduced, window 1007 slides to the left on the F-ω plane.

An example flow set point 1008 falls within window 1007. Situations are possible that can result in the flow set point falling outside window 1007. For example, load levels while connected to the grid, an incorrect choice for the flow set point, a change in output power of other microsources, and a transfer to island mode all can cause the flow set point to fall outside window 1007. For example, a first flow set point 1010 falls to the left of window 1007. In this situation, $P_{max}$ is exceeded. As another example, a second flow set point 1012 falls to the right of window 1007. In this situation, $P_{min}$ is exceeded. To avoid a flow set point falling outside window 1007, when the flow set point is outside window 1007, the controls reset the flow set point to the closest edge of window 1007.

Figure 11:
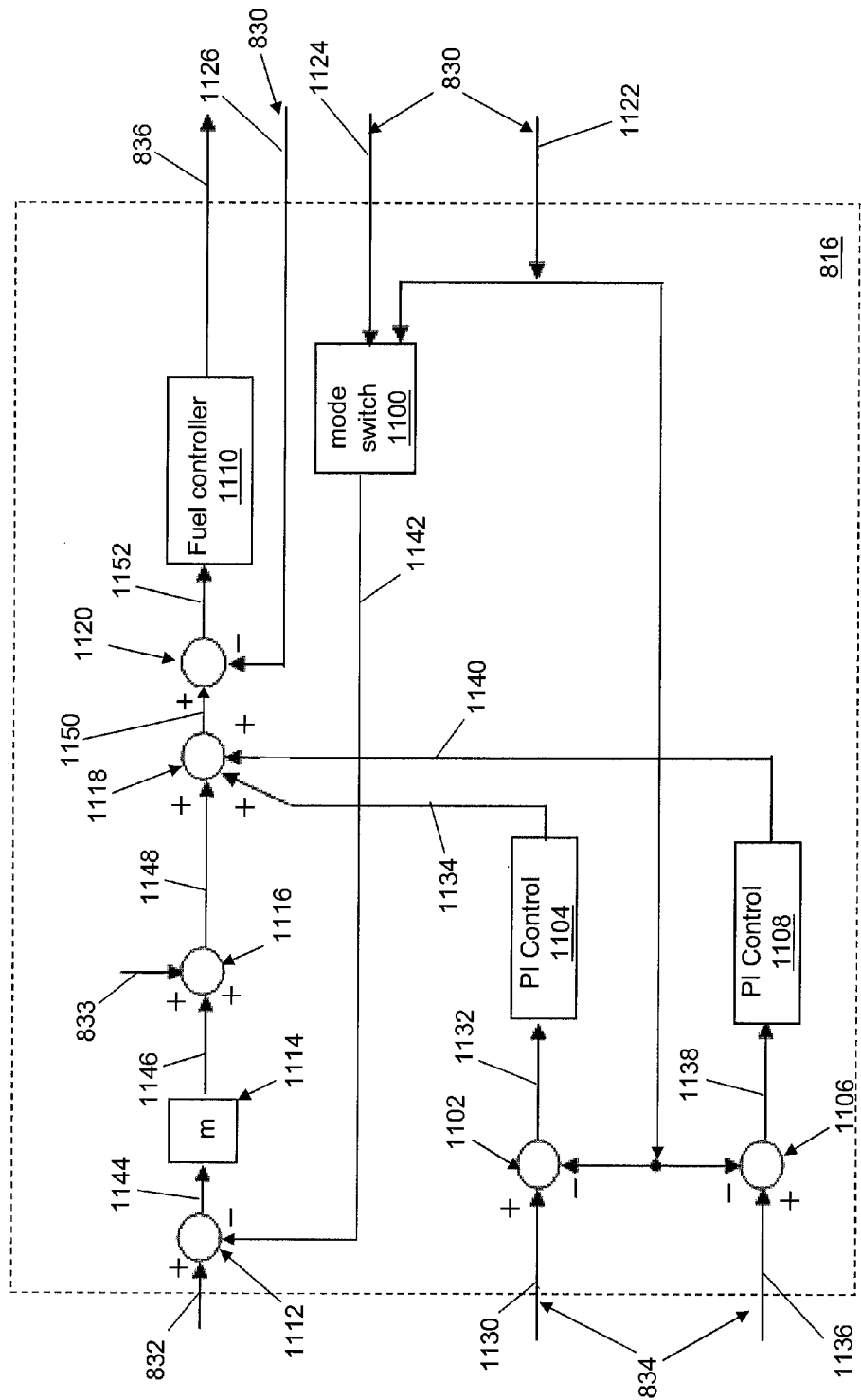
FIG. 11 is a block diagram of a P-ω droop governor of the controller of FIG. 8 in accordance with an exemplary embodiment.

With reference to FIG. 11, P-ω droop governor 816 is shown in accordance with an exemplary embodiment. P-ω droop governor 816 may include a mode switch block 1100, a first summer 1102, a first proportional-integral (PI) controller 1104, a second summer 1106, a second PI controller 1108, a fuel controller block 1110, a third summer 1112, a multiplier 1114, a fourth summer 1116, a fifth summer 1118, and a sixth summer 1120. The plurality of inputs 830 from observer 812 to P-ω droop governor 816 may include a three phase power P 1122, a three phase grid power flow F 1124, and an angular velocity or revolutions per minute of the shaft, $\omega_{shaft}$ 1126 of field controlled generator 820. With reference to FIG. 8, inputs of P-ω droop governor 816 also include power limits 834, a power set point 832, and a frequency set point 833. Outputs of P-ω droop governor 816 include a fuel command 836 input to prime mover 818.

With reference to FIG. 11, P-ω droop governor 816 may be used to provide zone power control or unit power control. As a result, power set point 832 may be $P_o$ or $F_o$. If unit power control is used, power flow 1142 is three phase power P 1122. If zone power control is used, power flow 1142 is three phase grid power flow F 1124. Mode switch 1100 determines which power parameter, three phase power P 1122 or three phase grid power flow F 1124, is input to third summer 1112. If unit power control is used, the sign of slope m in multiplier block 1114 is reversed.

Three phase power P 1122 is input to first summer 1102 and second summer 1106. Power limits 834 include a $P_{max}$ set point 1130 of field controlled generator 820 and a $P_{min}$ set point 1136 of field controlled generator 820. Changing the limits $P_{max}$ and $P_{min}$ controls the width of window 1007 shown with reference to FIG. 10. First summer 1102 compares $P_{max}$ set point 1130 with three phase power P 1122 to calculate a first power difference 1132 input to first PI controller 1104. For example, first summer 1102 subtracts three phase power P 1122 from $P_{max}$ set point 1130 so that first power difference 1132 is negative if the $P_{max}$ set point 1130 is exceeded. First PI controller 1104 controls the maximum power through a maximum frequency change 1134, $\Delta\omega_{max}$, that is limited between a minimum frequency and 0 Hz. In an exemplary embodiment, the minimum frequency is −1 Hz. Second summer 1106 compares $P_{min}$ set point 1136 with three phase power P 1122 to calculate a second power difference 1138 input to second Pi controller 1108. For example, second summer 1106 subtracts three phase power P 1122 from $P_{min}$ set point 1136 so that second power difference 1138 is positive if the $P_{min}$ set point 1136 is exceeded. Second PI controller 1108 controls the minimum power through a minimum frequency change 1140, $\Delta\omega_{min}$, that is limited between 0 Hz and a maximum frequency. In an exemplary embodiment, the maximum frequency is 1 Hz. $\Delta\omega_{max}$ and $\Delta\omega_{min}$ are scaled as radians for input to fifth summer 1118. In general, control parameters of the first and second PI controllers 1104, 1108 are set such that a steady state at a limit is reached in 10-20 cycles. Maximum frequency change 1134 and minimum frequency change 1140 maintain the flow set point within window 1007.

Third summer 1112 compares power set point 832 with power flow 1142 (three phase grid power flow F 1124 or three phase power P 1122 depending on the type of power control used as determined by mode switch 1100) to calculate a third power difference 1144 input to multiplier 1114. For example, third summer 1112 subtracts power flow 1142 from power set point 832. Multiplier 1114 multiplies third power difference 1144 by the slope m to determine a frequency change 1146. Depending on the type of power control, frequency change 1152 may be defined as $m(F_o-F)$ or $-m(P_o-P)$.

Fourth summer 1116 adds frequency set point 833 to frequency change 1146 to calculate an operating frequency 1148 input to fifth summer 1118. Fifth summer 1118 adds operating frequency 1148 with maximum frequency change 1134 and minimum frequency change 1140 to calculate a requested shaft speed 1150 input to sixth summer 1120. Sixth summer 1120 compares $\omega_{shaft}$ 1126 with requested shaft speed 1150 to calculate a shaft rotation error 1152 input to fuel controller 1110. For example, sixth summer 1120 subtracts $\omega_{shaft}$ 1126 from requested shaft speed 1150 to determine shaft rotation error 1152. The output of fuel controller 1110 is fuel command 836 for prime mover 818, which is calculated based on shaft rotation error 1152. In an exemplary embodiment, fuel controller 1110 is a proportional-integral controller. As known to those skilled in the art, can be implemented using a fewer or a greater number of elements than those depicted in FIGS. 8, 9, and 11. The elements shown are merely exemplary.

Through the operations of voltage regulator 814 and P-ω droop governor 816 effective utilization of a non-inverter based DER system is provided. A fuel command 836 is determined which controls prime mover 818 of field controlled generator 820 to provide voltage regulation and power vs frequency droop as necessary to effectively utilize a non-inverter based DER system in the microgrid.

Figure 13:
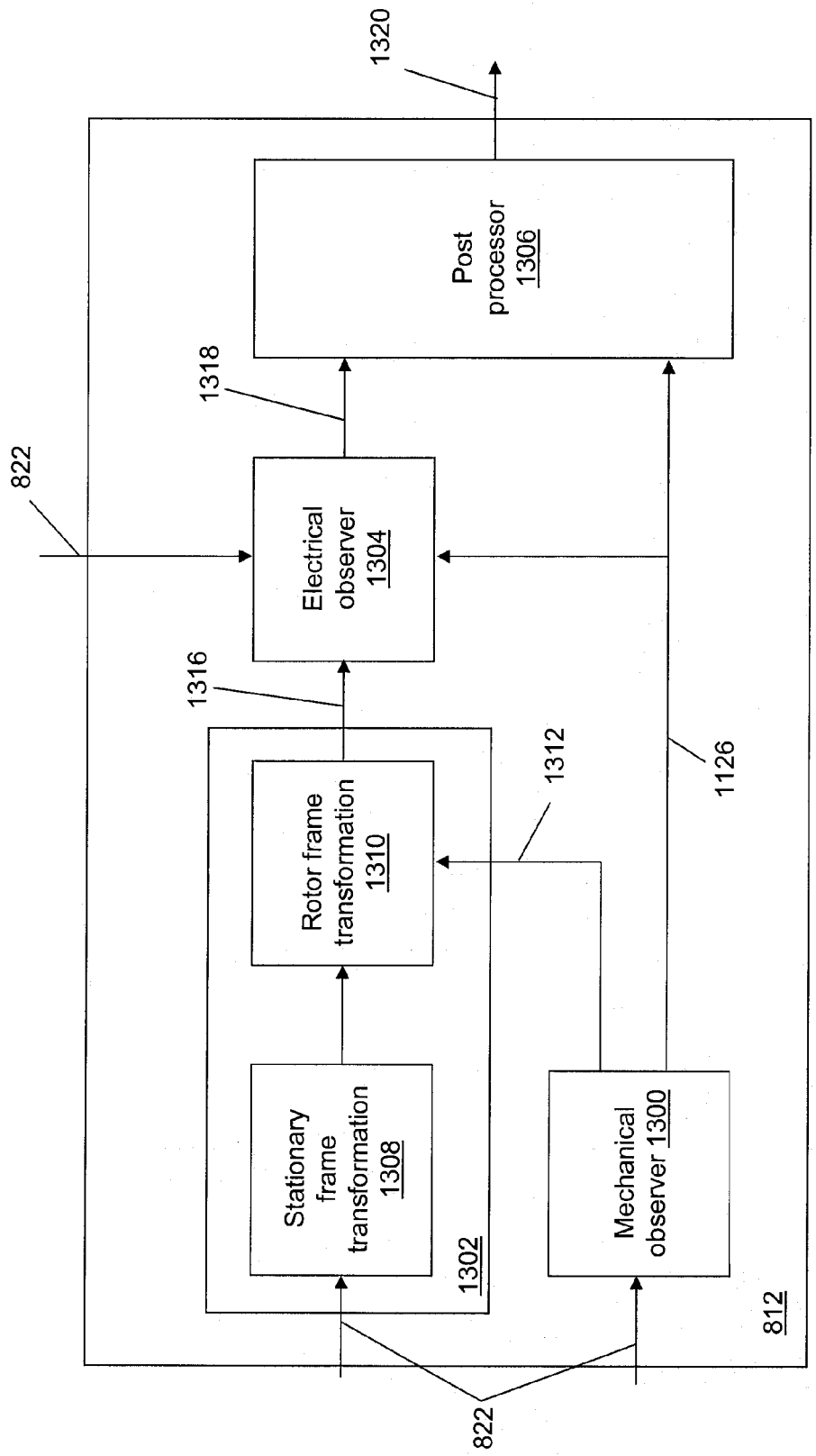
FIG. 13 is a block diagram of an observer used with the controller of FIG. 8 in accordance with an exemplary embodiment.

With reference to FIG. 13, a block diagram of observer 812 is shown in accordance with an exemplary embodiment. Observer 812 may include a mechanical observer 1300, a Blondel-Park transformation block 1302, an electrical observer 1304, and a post processor block 1306 to estimate the state of microsource system 800. Blondel-Park transformation block 1302 may include stationary frame transformation block 1308 and a rotor frame transformation block 1310. Inputs 822 include feeder current 808, bus current 809, and feeder bus voltage 810 to Blondel-Park transformation block 1302; a sampled $\omega_{shaft}$, a sampled rotor position, and fuel command 836 to mechanical observer 1300; and regulated output voltage 828 to electrical observer 1304. Mechanical observer 1300 implements a closed loop observer to calculate a rotor angle 1312 input to rotor frame transformation block 1310 and to calculate $\omega_{shaft}$ 1126 input to electrical observer 1304 and post processor block 1306 using the sampled $\omega_{shaft}$, the sampled rotor position, and fuel command 836. Using Blondel-Park transformation block 1302 and rotor angle 1312, the voltages and currents are transformed to a reference frame situated on the rotor of generator 820. The transformed quantities 1316 are input to electrical observer 1304 to generate electrical states 1318 of microsource system 800. Post processor 1306 generates output quantities 1320 needed by voltage regulator 814 and P-ω droop governor 816. The output quantities 1320 may include reactive power Q 908, terminal voltage 910, three phase power P 1122, three phase grid power flow F 1124, and $\omega_{shaft}$ 1126.

An initial rotor angle may be obtained utilizing the fact that, during no load, the terminal voltage is equal to the back electromotive force of generator 820. Thus, at no load, the rotor angle is the arc tangent of $$\frac{v_{ds_s}}{v_{qs_s}}.$$

To initialize the rotor angle, generator 820 is started with no load. A terminal voltage is measured and a rotor angle calculated. An input electrical power is calculated using the measured terminal voltages and currents. Mechanical observer 1300 is executed closed loop using a sampled $\omega_{shaft}$, the calculated rotor angle, and an input fuel command 836 to estimate $\omega_{shaft}$ 1126. $\omega_{shaft}$ 1126 is compared with the sampled $\omega_{shaft}$ to calculate a speed error. When the speed error falls below a tolerance value, observer 812 has locked on to the correct rotor speed and rotor angle. After locking on to the correct rotor speed and rotor angle, an integral of $\omega_{shaft}$ 1126 input to observer 812 provides rotor angle 1312 output from mechanical observer 1300, and the load can be applied to generator 820.

An additional loop to provide a zero steady state rotor angle estimation error can be included which uses a resolver on the shaft of generator 820. The output of the resolver is processed to obtain the rotor position. The initial rotor angle again is the arc tangent of $$\frac{v_{ds_s}}{v_{qs_s}}.$$

The resolver output is correlated with the rotor angle to calculate an angle offset. The resolver output can be used to determine rotor angle 1312 based on the angle offset calculated.

Blondel-Park transformation block 1302 employs a dq-transformation as known to those skilled in the art. The dq-transformation is used to reference the current and voltages to a common reference frame. The dq-transformation can be split in two steps. First, the original three-phase variables (currents, voltages, and/or magnetic fluxes) are transformed to a stationary reference frame in stationary frame transformation block 1308. For three-phase systems in equilibrium, this transformation results in two transformed components because the third component (the homopolar) is zero for any balanced set and is decoupled from the remaining dynamic equations. Second, the transformed variables from stationary frame transformation block 1308 are transformed to the rotating rotor reference frame in rotor frame transformation block 1310 to determine the transformed quantities 1316.

Electrical observer 1304 receives rotor speed 1314 and the transformed quantities 1316 and executes the following equations, which describe the electrical system:

$$\psi_{md}^r = \frac{\frac{\psi_{kb}^r}{x_{lkd}} + \frac{\psi_{fd}^r}{x_{lfd}} + i_{ds}}{\frac{1}{x_{md}} + \frac{1}{x_{lkd}} + \frac{1}{x_{lfd}}} \quad [1]$$

$$p\psi_{kd}^r = \omega_b r_{kd}\left(\frac{\psi_{md}^r - \psi_{kd}^r}{x_{lkd}}\right) \quad [2]$$

$$pE_f = \frac{-E_f + V_V}{T_e} \quad [3]$$

$$p\psi_{fd}^r = \omega_b \left[E_f \frac{r_{fd}}{x_{md}} + r_{fd}\left(\frac{\psi_{md}^r - \psi_{fd}^r}{x_{lfd}}\right)\right] \quad [4]$$

$$\psi_{mq}^r = \frac{\frac{\psi_{kq}^r}{x_{lkq}} + i_{qs}}{\frac{1}{x_{mq}} + \frac{1}{x_{lkq}}} \quad [5]$$

$$p\psi_{kq}^r = \omega_b r_{kq}\left(\frac{\psi_{mq}^r - \psi_{kq}^r}{x_{lkq}}\right) \quad [6]$$

$$T_{mech} = 1.6 m_f(t - T_d) - \frac{0.36}{\omega_r(t)} \quad [7]$$

$$p\omega_t = \frac{T_e + T_{mech}}{2H} \quad [8]$$

$$p\delta = \omega_b \omega_t \quad [9]$$

$$\psi_{qs}^r = \frac{\frac{x_{MQ}}{x_{lkq}}\psi_{kq}^r + x_{ls} i_{qs}}{1 - \frac{x_{MQ}}{x_{ls}}} \quad [10]$$

$$\psi_{ds}^r = \frac{\frac{x_{MD}}{x_{lkd}}\psi_{kd}^r + \frac{x_{MD}}{x_{lfd}}\psi_{fd}^r + x_{ls} i_{ds}}{1 - \frac{x_{MD}}{x_{ls}}} \quad [11]$$

where $x_{ls}$ is the armature leakage reactance, $x_{lkd}$ is the D-axis damper leakage reactance, $x_{lkq}$ is the Q-axis damper leakage reactance, $x_{lfd}$ is the field leakage reactance, $x_{md}$ is the D-axis mutual reactance, $x_{mq}$ is the Q-axis mutual reactance, $\psi_{kd}^r$ is the D-axis damper flux voltage, $\psi_{kq}^r$ is the Q-axis damper flux voltage, $\psi_{fd}^r$ is the D-axis field flux voltage, $T_e$ is the brushless exciter time constant, H is the inertia of generator 820, and $\omega_b$ is the base frequency in radians per second.

Equations [1]-[11] provide an estimation of the states of generator 820 in real-time. Postprocessor 1306 receives electrical states 1318 and rotor speed 1314 and calculates terminal voltage $V_t$ 910 (equation [14]), three phase power P 1122 (equation [15]), reactive power Q 908 (equation [16]), and three phase grid power flow F 1124 (equation [17]) as shown below.

$$V_{qs}^r = r_s i_{qs}^r + \omega_r \psi_{ds}^r \quad [12]$$

$$V_{ds}^r = r_s i_{ds}^r - \omega_r \psi_{qs}^r \quad [13]$$

$$V_t = \sqrt{V_{ds}^{r2} + V_{qs}^{r2}} \quad [14]$$

$$P = V_{qs}^r i_{qa}^r + V_{ds}^r i_{ds}^r \quad [15]$$

$$Q = V_{ds}^r i_{qs}^r - V_{qs}^r i_{ds}^r \quad [16]$$

$$F = V_{qs}^r i_{qf}^r + V_{ds}^r i_{df}^r \quad [17]$$

Figure 14:
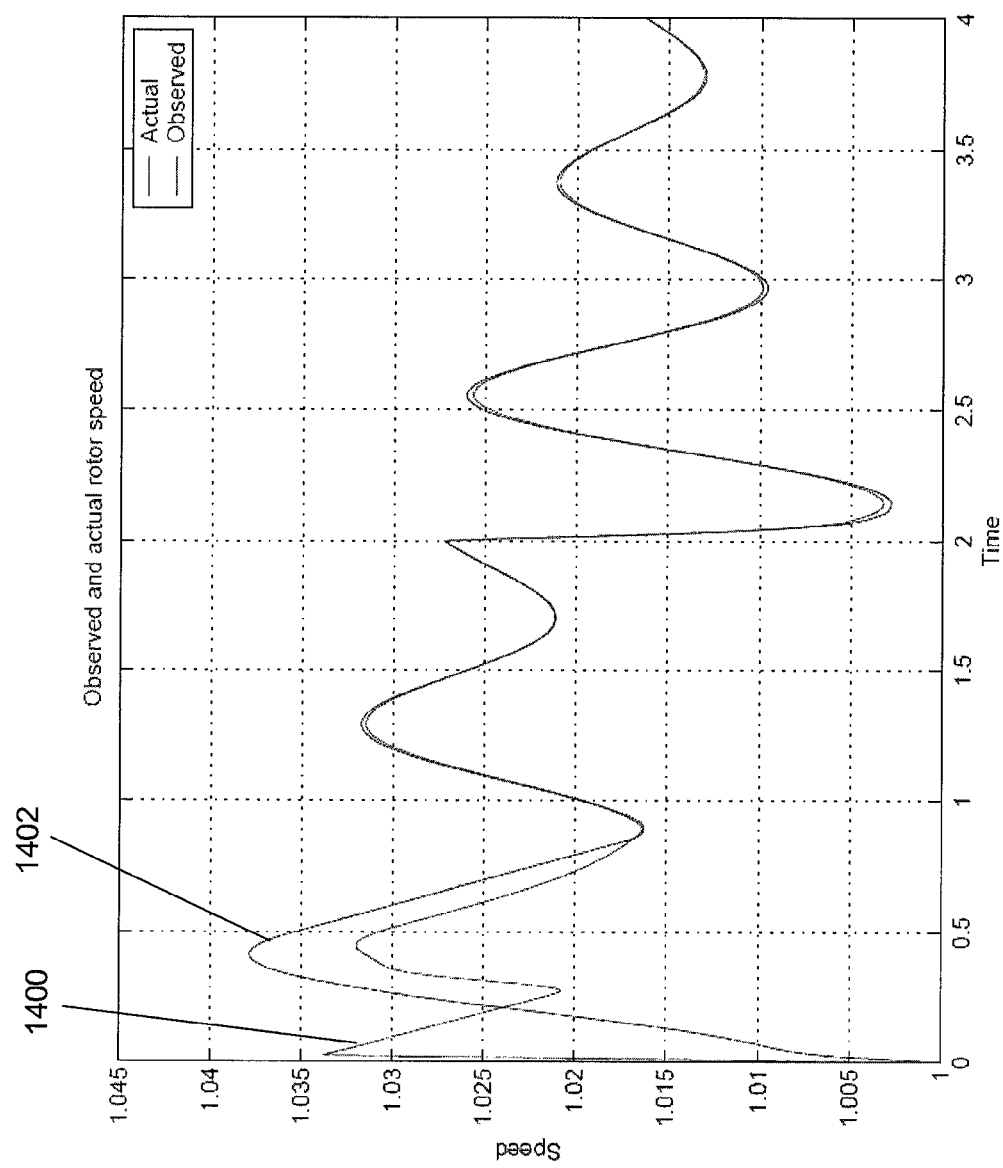
FIG. 14 is a graph comparing an actual rotor speed with an observed rotor speed determined using the observer of FIG. 13 in accordance with an exemplary embodiment.

A simulation was developed to verify observer 812. Simulation results for the actual and observed rotor speed are shown with reference to FIG. 14 for a step change in load from no load to a load of 4 kilowatts. An observed rotor speed curve 1400 tracks an actual rotor speed curve 1402.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A controller for controlling a non-inverter based distributed energy resource, the controller comprising circuitry to:
   calculate a maximum frequency change for a generator based on a first comparison between a first power set point and a measured power from the generator;
   calculate a minimum frequency change for the generator based on a second comparison between a second power set point and the measured power from the generator;
   calculate an operating frequency for the generator based on a third comparison between a power set point and a measured power flow;
   calculate a requested shaft speed for a prime mover by combining the calculated maximum frequency change, the calculated minimum frequency change, and the calculated operating frequency;
   calculate a shaft speed adjustment for the prime mover based on a fourth comparison between the calculated requested shaft speed and a measured shaft speed of the prime mover; and
   calculate a fuel command for the prime mover based on the calculated shaft speed adjustment to adjust a rotation rate of a shaft of the prime mover thereby controlling a frequency of an output power of the generator.

2. The controller of claim 1, wherein calculation of the operating frequency comprises use of $m(F_o - F)$, where m is a slope of an F-ω characteristic, $F_o$ is the power set point, and F is the measured power flow.

3. The controller of claim 1, wherein calculation of the operating frequency comprises use of $m(P_o - P)$, where m is a slope of a P-ω characteristic, $P_o$ is the power set point, and P is the measured power flow.

4. The controller of claim 3, wherein the measured power is the measured power flow.

5. The controller of claim 1, wherein calculation of the maximum frequency change comprises subtracting the measured power from the first power set point to determine a power differential.

6. The controller of claim 5, wherein calculation of the maximum frequency change further comprises applying the determined power differential to a proportional-integral controller.

7. The controller of claim 1, wherein calculation of the minimum frequency change comprises subtracting the measured power from the second power set point to determine a power differential.

8. The controller of claim 7, wherein calculation of the minimum frequency change further comprises applying the determined power differential to a proportional-integral controller.

9. The controller of claim 1, further comprising circuitry to regulate an output voltage of the generator using a voltage versus reactive power droop controller.

10. The controller of claim 1, wherein the first power set point is a maximum and further wherein the second power set point is a minimum.

11. A method of controlling a non-inverter based distributed energy resource, the method comprising:
calculating a maximum frequency change for a generator based on a first comparison between a first power set point and a measured power from the generator;
calculating a minimum frequency change for the generator based on a second comparison between a second power set point and the measured power from the generator;
calculating an operating frequency for the generator based on a third comparison between a power set point and a measured power flow;
calculating a requested shaft speed for a prime mover by combining the calculated maximum frequency change, the calculated minimum frequency change, and the calculated operating frequency;
calculating a shaft speed adjustment for the prime mover based on a fourth comparison between the calculated requested shaft speed and a measured shaft speed of the prime mover;
calculating a fuel command for the prime mover based on the calculated shaft speed adjustment; and
adjusting a rotation rate of a shaft of the prime mover based on the calculated fuel command to control a frequency of an output power of the generator.

12. The method of claim 11, wherein calculating the operating frequency comprises use of $m(F_o-F)$, where m is a slope of an F-ω characteristic, $F_o$ is the power set point, and F is the measured power flow.

13. The method of claim 11, wherein calculating the operating frequency comprises use of $m(P_o-P)$, where m is a slope of a P-ω characteristic, $P_o$ is the power set point, and P is the measured power flow.

14. The method of claim 12, wherein the measured power is the measured power flow.

15. The method of claim 11, wherein calculating the maximum frequency change comprises subtracting the measured power from the first power set point to determine a power differential.

16. The method of claim 15, wherein calculating the maximum frequency change further comprises applying the determined power differential to a proportional-integral controller.

17. The method of claim 11, wherein calculating the minimum frequency change comprises subtracting the measured power from the second power set point to determine a power differential.

18. The method of claim 17, wherein calculating the minimum frequency change further comprises applying the determined power differential to a proportional-integral controller.

19. The method of claim 11, further comprising regulating an output voltage of the generator using a voltage versus reactive power droop controller.

20. A microsource, the microsource comprising:
a generator;
a prime mover, the prime mover including a shaft connected to drive the generator to generate power at a frequency controlled by a rotation rate of the shaft; and
a controller operably coupled with the prime mover and the generator, the controller including circuitry
to calculate a maximum frequency change for the generator based on a first comparison between a first power set point and a measured power from the generator;
to calculate a minimum frequency change for the generator based on a second comparison between a second power set point and the measured power from the generator;
to calculate an operating frequency for the generator based on a third comparison between a power set point and a measured power flow;
to calculate a requested shaft speed for the prime mover by combining the calculated maximum frequency change, the calculated minimum frequency change, and the calculated operating frequency;
to calculate a shaft speed adjustment for the prime mover based on a fourth comparison between the calculated requested shaft speed and a measured shaft speed of the prime mover; and
to calculate a fuel command for the prime mover based on the calculated shaft speed adjustment to adjust the rotation rate of the shaft of the prime mover thereby controlling the frequency.

* * * * *

UNITED STATES PATENT AND TRADEMARK OFFICE
CERTIFICATE OF CORRECTION

PATENT NO. : 7,715,950 B2
APPLICATION NO. : 11/681014
DATED : May 11, 2010
INVENTOR(S) : Robert H. Lasseter Page 1 of 1

It is certified that error appears in the above-identified patent and that said Letters Patent is hereby corrected as shown below:

Col. 1; lines 7-11, please delete the paragraph reciting:

"This invention was made with United States government support awarded by the following agencies: National Science Foundation, Electrical & Communications System Div., Award No. 0078522. The United States government has certain rights in this invention."

under the header REFERENCE TO GOVERNMENT RIGHTS and replace with the following rewritten paragraph:

--This invention was made with government support under DE-AC03-76SF00098 awarded by the US Department of Energy. The government has certain rights in the invention.--

Signed and Sealed this

Seventeenth Day of August, 2010

David J. Kappos
*Director of the United States Patent and Trademark Office*